(12) United States Patent
Dewan et al.

(10) Patent No.: US 8,264,385 B1
(45) Date of Patent: Sep. 11, 2012

(54) USING ERROR BUCKETING AND BASELINE ANALYSIS FOR I18N TESTING

(75) Inventors: Rajat Dewan, Mountain View, CA (US); Norbert Runge, San Jose, CA (US)

(73) Assignee: Google Inc., Mountain View, CA (US)

( * ) Notice: Subject to any disclaimer, the term of this patent is extended or adjusted under 35 U.S.C. 154(b) by 64 days.

(21) Appl. No.: 12/948,143

(22) Filed: Nov. 17, 2010

Related U.S. Application Data

(63) Continuation-in-part of application No. 12/825,659, filed on Jun. 29, 2010.

(51) Int. Cl.
*H03M 7/00* (2006.01)
(52) U.S. Cl. .......................... 341/50; 341/51
(58) Field of Classification Search .............. 341/90, 341/82, 50, 51, 67; 707/705, 804; 709/217, 709/245
See application file for complete search history.

(56) References Cited

U.S. PATENT DOCUMENTS

| | | | |
|---|---|---|---|
| 6,745,348 B2 * | 6/2004 | Chung et al. | 714/47.1 |
| 6,983,238 B2 * | 1/2006 | Gao | 704/8 |
| 7,908,260 B1 * | 3/2011 | Bushee | 707/705 |

* cited by examiner

*Primary Examiner* — Peguy Jean Pierre
(74) *Attorney, Agent, or Firm* — Lerner, David, Littenberg, Krumholz & Mentlik, LLP

(57) ABSTRACT

Systems and methods to detect and analyze character set translation errors in an electronic document are provided. One method according to the invention includes detecting a first character string within the electronic document; converting the first character string to a sequence of bytes by use of a first character set; using a second character set to convert the sequence of bytes to a second character string; and detecting whether a length of the second character string is different than a length of the first character string. Detection results are stored in memory for later analysis. Systems according to aspects of the invention perform are configured to perform this and other methods. In one example, the system includes a test scheduler, a test result classifier, an analyzer unit, and a processor coupled to data storage for performing the aforementioned method.

18 Claims, 9 Drawing Sheets

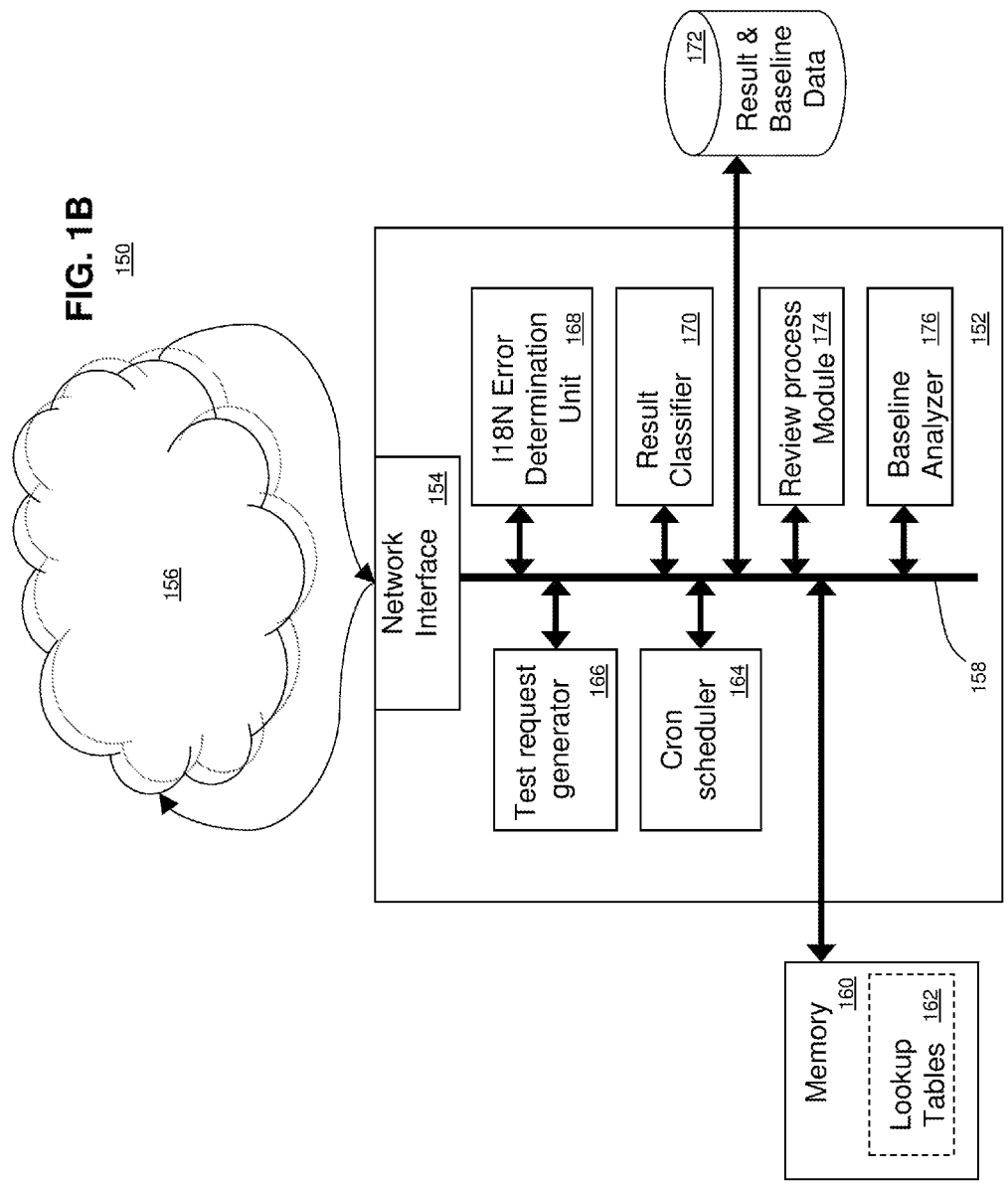

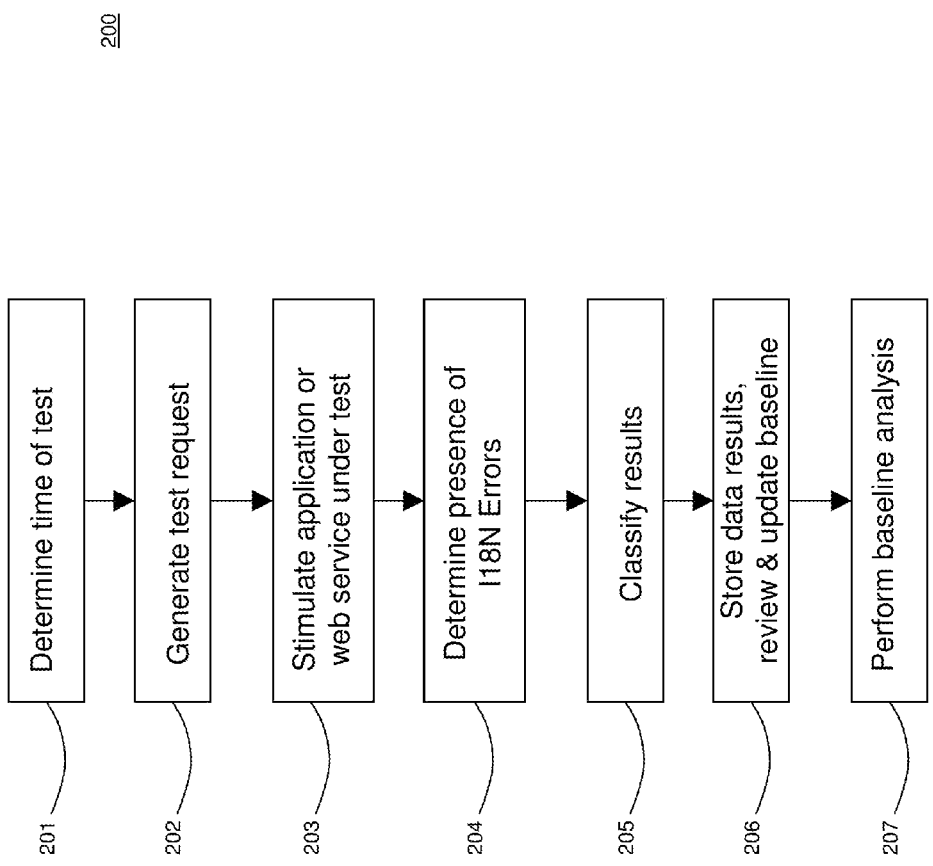

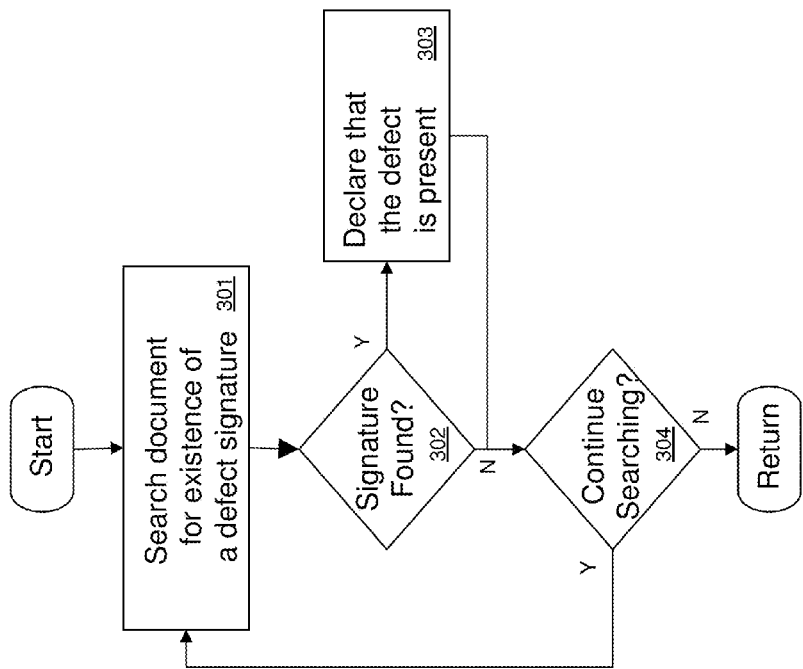

USING ERROR BUCKETING AND BASELINE ANALYSIS FOR I18N TESTING

CROSS-REFERENCE TO RELATED APPLICATION

The present application is a continuation-in-part of U.S. patent application Ser. No. 12/825,659, entitled "Identifying Misrepresented Characters in Strings of Text," filed on Jun. 29, 2010, the entire disclosure of which is hereby incorporated by reference.

BACKGROUND OF TEE INVENTION

In computing, internationalization and localization refer to the adaptation of computer software to different languages and regional differences. Internationalization is the process of designing a software application so that it can be adapted to various languages and regions without engineering changes. Localization is the process of adapting internationalized software for a specific region or language by adding locale-specific components and translating text. The terms internationalization and localization are frequently abbreviated to "I18N" and "L10N," respectively, due to the length of the words.

Known I18N error detection systems are not tailored for web-based services and do not verify the encoding aspects of web-based services.

In addition, there is an inadequate capability to continually monitor the health of the system for I18N errors for web-based services. Furthermore, it is difficult to test web-based services that are dependent on third party data or user generated data, because there is no assurance that the input data conforms to the applicable encoding standards.

BRIEF SUMMARY OF THE INVENTION

A method is provided for analyzing errors in an electronic document having a plurality of character strings. The method includes, for one or more character strings: determining whether the character string is encoded in one of a first encoding or a second encoding, the second encoding different than the first encoding; if the character string is encoded in the first encoding, testing whether a value of a characteristic of the character string is within a first preset range for the characteristic; and if the character string is encoded in the second encoding, testing whether the character string contains an I18N error.

The method may further test whether the first preset range includes values of the characteristic for shift-JIS code points or one or more private character values.

If the character string is encoded in the second encoding, the method may further include testing whether the character string includes at least one character within a second preset range of characters. The second preset range of characters may include one or more of control characters and a URC character.

Testing whether the character string contains an I18N error may further include converting the character string to a sequence of bytes by use of a third encoding, the third encoding being different than the first or second encodings. The sequence of bytes is converted to a character string of a fourth encoding. The presence of the I18N error is indicated by a sequence of two or three characters in the converted character string, with each character being a member of a predefined character set, depending on positions of the two or three characters.

The method may further include receiving the electronic document from a service under test; categorizing a test result into a category of error, to produce a category count; and storing the category count and a status of the service under test. Optionally, the method may include initiating a test of the service under test if the status of the service under test changes.

Optionally, the method may further include computing a first statistic from the category count over a first period of time; computing a second statistic from the category count over a second period of time, the second period of time shorter than the first period of time; and initiating a test of the service under test if the second statistic exceeds the first statistic by more than a configurable amount.

One or more embodiments of the invention may include a system to detect character set translation errors in an electronic document, the system including: a test scheduler configured to generate a stimulus to begin a test; a test request generator, configured to generate a sample document in response to the stimulus from the test scheduler; an output interface to provide the sample document to a system under test; an input interface to receive a test electronic document from the system under test, the test electronic document being derived from the provided sample document; an error determination unit configured to find one or more suspected errors in the test electronic document; a result classifier operably coupled to a data store and configured to classify one or more suspected errors to a category of error; and a baseline analyzer coupled to the result classifier in order to provide performance metrics to a user.

Optionally, the test scheduler of the system may be configured to schedule a plurality of tests. The tests may be scheduled chronologically, or at predetermined intervals from a previous test, or upon an occurrence of a predetermined triggering event, or on demand in response to a request from a user. Optionally, the one or more suspected errors may be indicated by predetermined character strings in the electronic document under test.

Optionally, the result classifier may include an interface to receive one or more indications of test conditions.

Optionally, the baseline analyzer is configured to analyze data from a plurality of tests.

Optionally, the error determination unit includes decision rules, at least one decision rule being based upon character probabilities in the test electronic document.

One or more embodiments of the invention may include means for providing a sample electronic document to a system under test; means for receiving a test electronic document from the system under test, wherein the test electronic document is derived from the provided sample electronic document; means for finding one or more suspected errors in the test electronic document; means for classifying the one or more suspected errors to a category of error; and means for analyzing the classified one or more suspected errors.

BRIEF DESCRIPTION OF THE DRAWINGS

FIG. 1B shows a block diagram of a system to detect and analyze I18N errors, in accordance with one embodiment of the invention.

FIG. 2 shows a flow chart of a process to detect and analyze I18N errors, in accordance with one embodiment of the invention.

FIG. 3 shows a first flow chart of a process to detect I18N errors, in accordance with one embodiment of the invention.

DETAILED DESCRIPTION

Figure 1A:
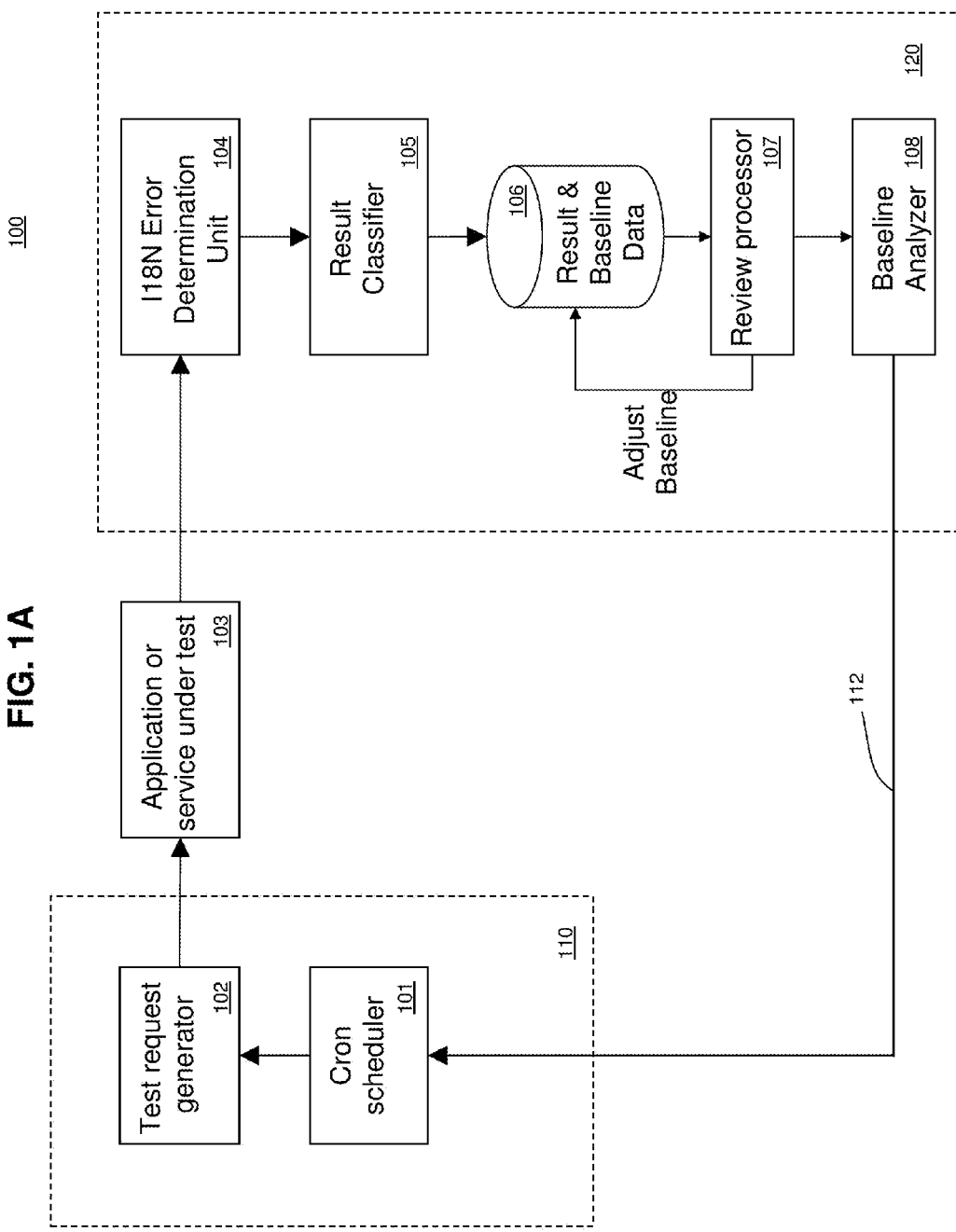
FIG. 1A shows a block diagram of a system to detect and analyze I18N errors, in accordance with one embodiment of the invention.

While the specification concludes with the claims particularly pointing and distinctly claiming the invention, it is believed that the present invention will be better understood from the following description. As used herein, "comprising" means the elements recited, or their equivalent in structure or function, plus any other element or elements which are not recited. The terms "having" and "including" are also to be construed as open ended unless expressly stated otherwise.

Information may originate from the Internet, intranet, or non-networked local storage. Information includes textual information provided as a sequence of bytes. The information may be, for instance, a web page or a document. The sequence of bytes may be read from a memory, or may be provided dynamically as the output of a process such as a computation. A character set is associated with the textual information, and one or more bytes within the sequence of bytes will map to an intended character within the character set. Examples of character sets include: the alphabets for some languages such as English, Spanish, Greek, Arabic, or Cyrillic; ideograms for some languages such as Chinese, Japanese, or Korean; or a collection of specialized symbols such as mathematical symbols, icons, or other symbols having a particular meaning. A character set may be a superset of other character sets, for instance the character set may include both English and Greek alphabets.

A character set ordinarily has a predetermined, fixed number of elements, but the number of elements may vary from one character set to another character set. A character set is usually defined by computing standards. For instance, UTF-8 is one character set featuring a variable-length character encoding for Unicode. UTF-8 is able to represent any character in the Unicode standard. UTF-8 encodes each character in 1 to 4 octets (8-bit bytes), the octets representing the code point of the character, with the single-octet encoding used only for the 128 US-ASCII characters.

UTF-16 is another character set, featuring a variable-length character encoding for Unicode, capable of encoding the entire Unicode repertoire. The UTF-16 encoding maps each character in the Unicode repertoire to a sequence of 16-bit words. Characters are known as code points and the 16-bit words are known as code units. For characters in the Basic Multilingual Plane (BMP) the resulting encoding is a single 16-bit word. For characters in the other planes, the encoding will result in a pair of 16-bit words, together called a surrogate pair. All possible code points from U+0000 through U+10FFFF, except for the surrogate code points U+D800-U+DFFF (which are not characters), are uniquely mapped by UTF-16.

Examples of other character sets known in the art include Windows-1252 and ISO 8859-1. Windows-1252 is a character encoding of the Latin alphabet, used by default in some legacy components of Microsoft Windows in English and some other Western languages. It is one version within the group of Windows code pages. The encoding is a superset of ISO 8859-1, but differs from the Internet Assigned Numbers Authority ("IANA") ISO-8859-1 by using displayable characters rather than control characters in the 0x80 to 0x9F range. The encoding is known to Windows by the code page number 1252, and by the IANA-approved name "windows-1252". This code page also contains all the printable characters that are in ISO 8859-15, although some characters are mapped to different code points.

The display of the information may include a web page displayed by a web browser, or a document displayed within a web browser with the help of an appropriate application handler. An appropriate application handler would be one that is able to process the document type, the document type contains character-based information, and the application handler is able to search for characters within the document. For instance, Microsoft Word™ or Excel™ would be appropriate application handlers. Adobe Flash™ would not be an appropriate application handler because it displays textual information as graphical content. Adobe Acrobat™ may be an appropriate application handler if the underlying PDF document is character-based or has been OCRed. The application handler may be displayed within the web browser, or may be displayed in a new window. One or more applications or network services may process the characters of the information, from the time the characters are read from storage or dynamically produced, through the application or network service which renders the data in a final form, for instance by presenting a display to a human user, or by producing another document which is stored.

Displayed information occasionally shows a text corruption. The text corruption may include one or more of an addition of unintended characters, a deletion of intended characters, or a substitution of unintended characters for intended characters. Intended characters are those characters within an intended character set that are indicated by the underlying bytes of the information. Unintended characters can include characters rendered using the correct underlying bytes but displayed using an incorrect character set, for instance a misinterpretation of the intended character set. The text corruption may be caused by one or more of the applications or network services that process the characters from the time the characters are read from storage or dynamically produced, through the application or network service which renders the data in a final form, for instance by presenting a display to a human user, or by producing another document which is stored.

There exist inadequate standards to test a system for text corruption errors. Aspects of the present invention provide a process for analysis and determination of the text corruption errors, and continual monitoring of the I18N health of a system under test by using baseline analysis. While there may be more than one reason for text corruption, aspects of the present invention are applicable to text corruption that is attributed to misinterpretation of the character set. For example, a misinterpretation of the character set may cause the bytes of a character in a UTF-8 encoding to be interpreted as bytes from a non-UTF-8 encoding. The misinterpreted bytes would then be converted again to a UTF-8 encoding, such that this double conversion of UTF-8 bytes results in a corrupted text output. The second conversion to UTF-8 encoding takes place when the misinterpreted bytes are used for further processing, and the processing system uses UTF-8 encoded text for the further processing.

For example, the em-dash character '—' is represented in the UTF-8 encoding by three bytes having a hexadecimal representation given by: xE2x80 x94. In some circumstances, the em-dash and its three byte encoding may be misinterpreted as being encoded in the wrong encoding. An application or network service may then attempt to convert these bytes back into UTF-8. In particular, the three bytes of the em-dash in UTF-8 encoding (xE2x80 x94) may be misinterpreted as being from a Windows-1252 character set and encoding. In the Windows-1252 character set, these bytes (xE2 x80x94) represent the following three Windows-1252 characters: â € ". An application or network service (not necessarily the same application or network service which initially misinterpreted the bytes) may then attempt to convert these three characters from the Windows-1252 character set (â € ") into the UTF-8 character set, having a hexadecimal representation of: xC3 xA2 xE2x82 xAC xE2x80x9D. Therefore, what was once a single character in three byte UTF-8 encoding has now become three characters with altogether 8 bytes. For example, if the original text is "all-in-one", it would become corrupted as: allâ € "inâ € "one. Many examples herein illustrate embodiments of the invention using the Windows-1252 character set because it is the default character set in Windows for Western languages. It should be understood that embodiments of the invention described herein can be modified to search for error signatures based upon a different intermediate character set.

Text corruption errors as described above are not necessarily repeatable, even when the same textual information is processed. The occurrence of the text corruption errors may depend upon factors which can change over time, such as the current state of intermediate systems or network services which process the textual data, the software version of the intermediate systems or network services the processor loading or CPU usage of the intermediate systems or network services, or other factors not presently known. It is desirable to know the root cause of the text corruption errors so that effective corrections can be made.

Patterns of intermittent errors may emerge when a system is repeatedly stimulated, while recording the operating conditions and a result of the stimulus. Or a change in the pattern of intermittent errors may be observed to coincide with a change in a characteristic of the intermediate systems or network services, such as their state or software version. An analysis of the pattern of errors is useful for determining potential sources of text corruption errors. Therefore, a process and system that is able to repeatedly stimulate an application or network service under test, and record the operating conditions and response, will be useful in this regard. Several thousand repetitions per locale may be used to stimulate the application or network service under test, in which "locale" refers to a collection of international preferences related to a geographic region associated with a user. Assuming twenty-four (24) locales are tested, and assuming 5,000 repetitions per locale, the total number of test repetitions will be 120,000. The operating conditions and response can be analyzed in real time, and/or can be analyzed offline at a later time. Saving the operating conditions and response in a memory storage can facilitate system analysis at a later time, and can facilitate comparison of present results with historical results in order to uncover longer-term performance trends.

FIG. 1A illustrates an embodiment of a system 100 that is useful for the stimulation, classification and analysis of text corruption errors that may be caused by misinterpretation of character sets as information passes between applications and/or network services. System 100 may be partitioned into subsystem 110 which generates a test stimulus, and subsystem 120 which receives a response from an application or network service 103 under test. Subsystem 120 may further analyze and process the response, as described below in further detail. Subsystems 110 and 120 may be separated, or may be physically collocated and/or implemented by a shared processor.

The system 100 may be implemented by one or more processors that are programmed with software stored in a storage medium (not shown in FIG. 1A), the software being configured to perform a method in accord with an embodiment of the invention. The processor implementing the method to schedule tests and generate tests may, for instance, be the same as the processor that receives and analyzes the document to be checked for errors, or may be a part of the same processor (for example, one core in a multi core processor), or may be separate processors but in communication with each other, for instance by either a local electrical connection or by a networking connection that allows for a relatively longer remote connection. The processor is not limited and may also be implemented as an ASIC or other kind of processing device known in the art. The storage medium storing the software is not limited, and may include any physical and electronic medium used for electronic storage, such as a hard disk, ROM, EEPROM, RAM, flash memory, nonvolatile memory, or any substantially and functionally equivalent medium. The software storage may be co-located with the processor implementing an embodiment of the invention, or at least a portion of the software storage may be remotely located but accessible when needed.

A cron scheduler 101 can be used to schedule tests. The tests may be scheduled chronologically, for instance at predetermined times, or at predetermined intervals from a previous test such as a predetermined interval of time from the start or finish of the previous test. The tests may also be scheduled to depend upon the occurrence of predetermined triggering events, or can be scheduled on demand by a human user. For instance, it may be desirable to schedule extra tests during certain network conditions. Cron scheduler 101 may also be configured to schedule multiple tests, either independently or in dependency with at least one other test.

Upon a determination by cron scheduler 101, test request generator 102 is controlled in order to produce a test stimulus. The test stimulus is provided to an application or network service 103 under test, which is ordinarily external to the system 100. The test stimulus may be tailored to the kind of text corruption errors that are being investigated, for instance the test stimulus may be configured to probe known or suspected vulnerabilities in the application or service 103 under test, or to track over time the response to a test stimulus.

A response from the application or network service 103 under test is received by the error determination unit 104. Error determination unit 104 detects whether a suspected text corruption error exists in the data returned by the application or network service 103 under test. A suspected text corruption error is declared when certain predetermined patterns of characters are detected in the data returned by the application or network service 103 under test.

The suspected text corruption errors may then be analyzed by result classifier 105, which will categorize the suspected text corruption errors into one or more categories (i.e., "buckets") of errors. Categorization of errors by result classifier 105 may depend upon factors such as the particular suspected text corruption error that is detected, loading of the application or network service 103 under test by other tasks and/or other processes that may use resources available to the application or network service 103 under test, or time of occurrence. For instance, a first set of categories of errors can include:

a) Double conversion of characters. This type of error can occur when a source document that is encoded in a first character set is read by an application or network service which misinterprets the document (or a portion thereof) as being encoded in a second character set, and renders the misinterpreted text in a different character set, usually the first character set.

b) Presence of a Unicode replacement character, U+FFFD ("URC"). URC ordinarily is used to replace an unknown or unprintable character;

c) Characters outside full width katakana range. Full width katakana is discussed below in more detail;

d) Characters outside half width katakana range. Half width katakana is discussed below in more detail;

e) Characters outside a known private range. For instance, a private character may be one which has meaning only to a particular application program which reads it. For instance, an emoticon used by one mail reader (e.g., GMail™) may be stored in a private Unicode character, and may not be properly recognized by a second mail reader (e.g., Yahoo!™ mail).

f) Characters outside a Shift JIS range, i.e., outside an encoding of the Japanese character set. Shift JIS is discussed below in more detail;

g) Invalid character normalization, i.e., invalid conversion to a different character encoding; or h) Presence of control characters.

Japanese has three main writing systems: hiragana, katakana and kanji. Roman letters, Arabic numerals and various punctuation marks are also commonly found in Japanese writing. All of these different writing systems can be found in the same Japanese sentence. Katakana may be either half-width katakana or full-width katakana. Half-width katakana displays each character as tall and thin, compared to full width katakana which displays each character as having about the same height and width. Japanese characters, including katakana, are encoded in the JIS character set. Shift-JIS was originally developed by Microsoft™ as an encoding of JIS, although slight variations of Shift-JIS have also been employed. Many Japanese web pages use Shift-JIS. Other web pages may use UTF-8. Shift-JIS includes both half-width katakana and full-width katakana, encoded in separate ranges. When performing various embodiments of the present invention, additional checks may be added to check whether the Japanese writing includes a mixture of katakana, hiragana, kanji, Arabic numerals, and Latin alphabet.

The result classifier 105 may further classify the suspected character set errors among a second set of categories of errors. A first category is those I18N errors which are a part of the markup or web page that originates from an external web page, such as search result title or snippet, and where the error is already in the originating, external web page. Here, the application or network service under test has picked up the erroneous characters from the external web page. A second category is those I18N errors that correspond to a mis-encoding the external web page, such as a missing or incorrect encoding declaration. I18N errors not in the first or second categories are assigned to a third category, which may contain unexpected issues such as mixed encodings in which the external web page has characters of different encodings.

The output of result classifier 105 will be stored in a result and baseline data store 106. The information stored may include analysis results from result classifier 105, statistics or updates of statistics based upon the analysis results (e.g., an error count per error category or test condition over one or more periods of time), a time stamp, and/or test conditions such as one or more indicators of the state or status of the application or network service under test. Test conditions can also include identification of, and the loading of, concurrent processes executing in the application or network service under test.

The results stored in the result & baseline data store 106 can be read and post-processed by a review processor 107, which can be a processor (optionally shared with other portions of system 100) that is under the control of software stored in a storage medium. Review processor 107 can analyze the results and adjust one or more baselines maintained in result and baseline data store 106. The types of baselines are not limited and may include moving averages over one or more timeframes, or high/low range brackets, or other statistical methods known in the art, and any combination thereof.

A baseline analyzer 108 is operatively connected to review processor 107. The baseline analyzer 108 is configured to analyze the data from the result and baseline data store 106 over a period of time that is relatively long compared to the duration of an individual test, in order to detect trends or patterns in the data, such as a slowly-varying trend, and to present the results of that analysis to a user. Baseline analyzer 108 may be configured to present results to a user by use of a "dashboard" interface, namely a simultaneous visual presentation of one or more performance metrics relevant to system 100. The baseline analyzer 108 may be configured to provide an interface 112 to cron scheduler 101 such that analysis by baseline analyzer 108 can be used to trigger cron scheduler 101. Interface 112 might be used when the baseline analyzer 108 detects unusual changes in the analysis results, such as error category counts exceeding the baseline for that category by more than a configurable amount. Interface 112 may also be desirable when a rapid verification of changes to the application or service under test 103 is desired.

By use of the system 100, data stored in the result and baseline data store 106 can be used for establishing a baseline for (I18N) health of systems that are dependent upon third party data or user-generated data. System 100 can periodically run a large number of tests of the system under test (e.g. several thousand tests). Over time, this baseline is monitored for increase in relative numbers, or spikes in, the number of I18N errors. When this case happens, the category of error causing the spike may provide clues that are useful for localizing the bug.

I18N errors may be identified depending on the needs of the system. For example, I18N errors may be relatively less important for web-based applications displayed on a hand-held device (e.g., a smart phone) than for web-based applications displayed on a conventional desktop or laptop PC. Systems implementing web-based applications may invoke more than one process. For example, the Google™ Search engine and Gmail™ both store and display the document and/or web page, wherein separate processes are ordinarily used for storing and for displaying. Each process may introduce I18N errors. Aspects of the present invention include a process and system for I18N test analysis that is usable for data oriented web-based services like the Google™ Search engine and Gmail™.

Embodiments of the present invention are suitable for, but not limited to, web-based services, including stateless web-based services, and client-server architectures. A stateless web service is one in which the service does not hold any private information within the service between successive instances of the service. Any information produced by a first instance of the service can be written to a data storage, from which the next instance of the service can retrieve the information that is needed. In certain embodiments, use of stateless web services means that analysis of I18N errors can proceed without the need to establish a predetermined system state or private information, such as a login state or ID.

FIG. 1B illustrates a system 150 according to aspects of the invention. System 150 includes one or more processors 152, memory 160, and data storage 172. Memory 160 and data storage 172 may be implemented in separate storage devices, or may be implemented in a combined storage device. Processor 152 uses a network interface 154 to stimulate, and receive a response from, an application or network service 156 under test. Network interface 154 may be bidirectional, or separate unidirectional transmit and received network interfaces may be provided (not shown in FIG. 1B). Also not shown in FIG. 1B, various systems or processes external to processor 152 may interface between processor 152 and the application or network service 156 under test. Such external systems or processes may include a web parser, a web indexer, and a web renderer.

Processor 152 includes a communications bus 158 used to communicate with processing modules described below. Processing modules may be processes implemented by software stored in a memory, where the software is executable on processor 152. Memory 160 is usable for storing the software. A processing module may also be implemented by a separately-identifiable hardware portion of processor 152, such as a co-processor or a core of a multi-core processor. Processing modules are not limited to these configurations, and may include additional configurations. Processor 152 may include more than one kind of implementation of the processing modules.

System 150 includes a cron scheduler 164, which is a processing module that is substantially similar in function to cron scheduler 101 of FIG. 1A. System 150 also includes a test request generator 166, which is a processing module that is substantially similar in function to test request generator 102 of FIG. 1A. System 150 also includes an I18N error determination unit 168, which is a processing module that is substantially similar in function to the I18N error determination unit 104 of FIG. 1A.

As shown, system 150 desirably also includes a result classifier 170, which is a processing module that is substantially similar in function to the result classifier 105 of FIG. 1A. System 150 further includes a review process module 174, which is a processing module that is substantially similar in function to the review processor 107 of FIG. 1A. System 150 also includes a baseline analyzer 176, which is a processing module that is substantially similar in function to the baseline analyzer 108 of FIG. 1A.

Memory 160 may include a portion used to store lookup tables 162. Lookup tables 162 may be used in one or more aspects of the invention.

FIG. 2 illustrates a flow chart of process 200 in accord with aspects of the invention. It will be appreciated by those skilled in the art that one or more of the acts described in FIG. 2 may be performed by hardware, software, or a combination thereof, as may be embodied in one or more computing systems such as a client system or a server system.

Referring to FIG. 2, at a first stage 201 a time of test is determined. The determination may be made by any number of reasons, such as scheduling tests at regularly-spaced intervals of time, or at fixed time offsets from a previous test, or upon trigger by an outside event or results of later analysis (not shown). First stage 201 may be performed by a processor programmed with appropriate software, or initiated in response to user input.

After a test time is determined and that time has arrived, then a second stage 202 is entered, during which a test request is generated. The test request may be configured to probe known or suspected vulnerabilities in the application or service under test.

After the test request is generated, then a third stage 203 is entered during which time the application or web service under test is stimulated by the test request. In response to the stimulus, the application or web service under test produces a response which may include an I18N error. It should be understood that, because the test system itself does not include the application or service under test, the production of a response by the application or web service under test, by itself, is not necessarily within a process embodied by the invention.

While the application or service under test may be producing a response, a fourth stage 204 is entered during which time a process embodying the invention waits to receive a response from the application or service under test. Once the response is received, a process embodying aspects of the invention analyzes the received result in order to detect the presence of one or more I18N errors.

After the presence of any I18N errors are detected, a fifth stage 205 is entered during which time the results of the fourth stage 204 are classified. The classification may include categorizing the nature of any I18N or other errors found, including an absence of errors if no errors are detected. Further processing may be performed during stage 205, such as generating histograms or performing other statistical analysis.

After the results are classified, a sixth stage 206 is entered, during which time data is stored and/or updated in a memory.

After the results are stored, seventh stage 207 may be entered during which time the stored results are analyzed in order to perform high-level analytic computations. This may include performing a baseline analysis, comparing moving averages of various lengths or start/stop times, performing a trending analysis, presenting the test results and/or computations therefrom in a form suitable for presentation to a human user, or transferring information to external systems (not shown). The analysis may be based on category data individually, or in comparison with other category data (e.g., a correlation). It should be noted that the analysis may not take into account the results from last test run, but rather may compare the result of the last test run against the results of some or all previous test runs stored in the data store. Persons of skill in the art of statistical analysis will recognize that other kinds of analysis can be performed using the data stored during the sixth stage 206. By way of example, the seventh stage 207 may be performed less frequently than the first through sixth stages 201-206. The seventh stage 207 may be performed on-demand by a human user, may be performed on a predetermined schedule such as at fixed intervals of time such as weekly, daily or hourly, or may be initiated at variable times, such as by the providing of an interrupt signal by an earlier stage such as stage 204 or stage 205. The interrupt signal, if used, may be generated on the basis of the detection of certain kinds of I18N errors or patterns of such errors.

A process in accord with an embodiment of the invention will be illustrated below by way of a non-limiting example using the architecture 100 of FIG. 1A and the method of FIG. 2. In particular, the exemplary process illustrates operation of stage 204, in which the presence of I18N errors is detected.

Broadly described, the exemplary process analyzes whether a sequence of bytes in a document received from the application or network service under test may have arisen due to I18N errors having occurred within the application or network service under test. In event of an I18N error, the intermediate incorrect character set is not necessarily known. The presence of an error can be inferred if, for instance, a character string within the document received from the application or network service under test fits a pattern of known errors, such as a double conversion of character sets, or includes invalid characters such as control characters, URC, or the like.

Given a received first character string of a first character set, which may be a portion of a larger sequence of characters, a double conversion error can be detected if the received first character string can be converted into a sequence of bytes using a second character set, such that the sequence of bytes can then be converted into a second character string, using a third character set that is different than the second character set. The second character string may be a single character from the third character set. The third character set may be the same as the first character set.

If the first and/or second character sets are known in advance or suspected, one or more lookup tables may be precomputed. Such a lookup table would list character strings that are known to arise, within the document received from the application or network service under test, if a character in the source document presented to the application or network service under test undergoes an I18N error, namely a conversion from one character set to another character set, and from there into a third character set which may or may not be the same as the first character set. The lookup tables can then be incorporated into a byte-by-byte examination of each received sequence of characters, or can be used to search directly for multi-character strings within the document received from the application or network service under test.

In the present examples, a web page is validly encoded in a first character set such as the UTF-8 character set. When this web page is read by a network service under test, the network service under test may interpret this web page or a portion thereof to be encoded in a second character set, such as a Windows-1252 character set, a Windows-1250 character set, or any other character set such as single byte Greek. For the sake of example only, assume the second character set is Windows-1252. The system under test may attempt to convert the web page to a third character set. The third character set is different than the second character set; however, the third character set may or may not be the same as the first character set. In the present case, assume that the third character set is the same as the first character set, namely the UTF-8 character set. Further assume that the web page contains only one, two, or three byte UTF-8 characters. Although some UTF-8 characters are represented using four bytes, the four-byte characters are rarely used or are historical characters. The present example concentrates on describing only the more common two-byte and three-byte characters, but the analysis may be extended to four-byte UTF-8 characters.

Table 1 below lists the format and encoding range of two-byte and three-byte UTF-8 encoded characters. Encoding range refers to the range of UTF-16 characters that have the same binary representation as the corresponding two-byte or three-byte UTF-8 character. That is, each bit position marked with "x" under the "Format of UTF-8" column corresponds to a bit in a UTF-16 encoded character indicated under the "Range of UTF-16 encoding" column, at the same position as the position indicated by the x. Characters encoded in two-byte UTF-8 format are always padded with five '0' bits in their corresponding UTF-16 format. These five bits are not included in the UTF-8 format, thus the eleven 'x' positions in two-byte UTF-8 format. In the table, an "x" used as a prefix indicates hexadecimal notation, and an "x" not used as a prefix indicates an arbitrary binary digit.

TABLE 1

| Type | Format of UTF-8 | | | Range of UTF-16 encoding |
|---|---|---|---|---|
| Two-Byte | 110x xxxx $C_{21}$ | 10xx xxxx $C_{22}$ | | x0080 to x07FF |
| Three-Byte | 1110 xxxx $C_{31}$ | 10xx xxxx $C_{32}$ | 10xx xxxx $C_{33}$ | x0800 to xFFFF |

If the bytes of a three-byte UTF-8 character are interpreted as a Windows-1252 character, only a subset of the Windows-1252 characters can appear, given the properties of UTF-8 encoding. For three-byte UTF-8 characters, the first byte is 1110 xxxx. Therefore, the first byte in three-byte UTF-8 character can take on only one of 16 values within the hexadecimal range of xE0 to xEF, inclusive. For each of these 16 values, Table 2 below presents the corresponding character $C_{31}$ from the Win-1252 character set, the UTF-8 hexadecimal encoding of the corresponding character from the Win-1252 character set, and UTF-16 hexadecimal encoding of the corresponding character.

TABLE 2

| Win-1252 code/ 1st UTF-8 byte | E0 | E1 | E2 | E3 | E4 | E5 | E6 | E7 | E8 | E9 | EA | EB | EC | ED | EE | EF |
|---|---|---|---|---|---|---|---|---|---|---|---|---|---|---|---|---|
| Win-1252 Char. ($C_{31}$) | à | á | â | ã | ä | å | æ | ç | è | é | ê | ë | ì | í | î | ï |
| UTF-8 encoding | C3 A0 | C3 A1 | C3 A2 | C3 A3 | C3 A4 | C3 A5 | C3 A6 | C3 A7 | C3 A8 | C3 A9 | C3 AA | C3 AB | C3 AC | C3 AD | C3 AE | C3 AF |
| UTF-16 encoding | 00 E0 | 00 E1 | 00 E2 | 00 E3 | 00 E4 | 00 E5 | 00 E6 | 00 E7 | 00 E8 | 00 E9 | 00 EA | 00 EB | 00 EC | 00 ED | 00 EE | 00 EF |

Let $C_{31}$ refer herein to the set of characters in the Windows-1252 character set which can be interpreted as being the first byte of a three byte UTF-8 character. It should be noted from Table 2 that the hex code in UTF-8 and in UTF-16 encoding for the $C_{31}$ characters is consecutive, without interruption. A consecutive range of hex codes simplifies the lookup by replacing 16 tests of whether the hex code of a received character equals a value, by a single test of whether the hex code of a received character is within a range of values.

According to Table 1, the second byte $C_{32}$ and third byte $C_{33}$ of a three-byte UTF-8 character are always of the format: 10xx xxxx. Thus, both of bytes $C_{32}$ and $C_{33}$ have an allowable hex code value within the hexadecimal range of: [80]-[BF], inclusive. The resultant characters can be calculated if a byte having a hex code value in the range of [80]-[BF] is converted to a Windows-1252 character set, and from there is converted into the UTF-8 or UTF-16 character set. Within this range, bytes having a hex code value in the range of [A0]-[BF] will map to a consecutive byte range and, thus, a consecutive character range in the character sets for Windows-1252, UTF-8 and UTF-16. However, bytes having a hex code value in the range of [80]-[9F] will map to nonconsecutive bytes and characters in the character sets for Windows-1252, UTF-8 and UTF-16.

For second byte $C_{32}$ or third byte $C_{33}$ having a hex code value in the range of [A0]-[AF], Table 3 below presents the corresponding character from the Win-1252 character set, the UTF-8 hexadecimal encoding of the corresponding character from the Win-1252 character set, and UTF-16 hexadecimal encoding of the corresponding character.

TABLE 3

| Win-1252 code/ 2nd or 3rd UTF-8 byte | A0 | A1 | A2 | A3 | A4 | A5 | A6 | A7 | A8 | A9 | AA | AB | AC | AD | AE | AF |
|---|---|---|---|---|---|---|---|---|---|---|---|---|---|---|---|---|
| Win-1252 Char. ($C_{32}$, $C_{33}$ or $C_{22}$) | Nbsp | ¡ | ¢ | £ | ¤ | ¥ | ¦ | § | ¨ | © | ª | « | ¬ | SHY | ® | ¯ |
| UTF-8 encoding | C2 A0 | C2 A1 | C2 A2 | C2 A3 | C2 A4 | C2 A5 | C2 A6 | C2 A7 | C2 A8 | C2 A9 | C2 AA | C2 AB | C2 AC | C2 AD | C2 AE | C2 AF |
| UTF-16 encoding | 00 A0 | 00 A1 | 00 A2 | 00 A3 | 00 A4 | 00 A5 | 00 A6 | 00 A7 | 00 A8 | 00 A9 | 00 AA | 00 AB | 00 AC | 00 AD | 00 AE | 00 AF |

For second byte $C_{32}$ or third byte $C_{33}$ having a hex code value in the range of [B0]-[BF], Table 4 below presents the corresponding character from the Win-1252 character set, the UTF-8 hexadecimal encoding of the corresponding character from the Win-1252 character set, and UTF-16 hexadecimal encoding of the corresponding character.

TABLE 4

| Win-1252 code/ 2nd or 3rd UTF-8 byte | B0 | B1 | B2 | B3 | B4 | B5 | B6 | B7 | B8 | B9 | BA | BB | BC | BD | BE | BF |
|---|---|---|---|---|---|---|---|---|---|---|---|---|---|---|---|---|
| Win-1252 Char. ($C_{32}$, $C_{33}$ or $C_{22}$) | ° | ± | ² | ³ | ´ | µ | ¶ | · | ¸ | ¹ | º | » | ¼ | ½ | ¾ | ¿ |
| UTF-8 encoding | C2 B0 | C2 B1 | C2 B2 | C2 B3 | C2 B4 | C2 B5 | C2 B6 | C2 B7 | C2 B8 | C2 B9 | C2 BB | C2 BB | C2 BC | C2 BD | C2 BE | C2 BF |
| UTF-16 encoding | 00 B0 | 00 B1 | 00 B2 | 00 B3 | 00 B4 | 00 B5 | 00 B6 | 00 B7 | 00 B8 | 00 B9 | 00 BA | 00 BB | 00 BC | 00 BD | 00 BE | 00 BF |

For second byte $C_{32}$ or third byte $C_{33}$ having a hex code value in the range of [80]-[8F], Table 5 below presents the corresponding character from the Win-1252 character set, the UTF-8 hexadecimal encoding of the corresponding character from the Win-1252 character set, and UTF-16 hexadecimal encoding of the corresponding character. Some of the UTF-8 encodings use two bytes per character, and some UTF-8 encodings use three bytes per character. As can be seen from Table 5, the encodings in the UTF-8 and UTF-16 character sets are not consecutive. Three of the Win-1252 characters do not map to an assigned character in the UTF-8 or UTF-16 character sets (indicated as "NA" in Table 5), so if a double conversion takes place, these characters will be mapped to the Unicode replacement character.

TABLE 5

| Win-1252 code/ 2nd or 3rd UTF-8 byte | 80 | 81 | 82 | 83 | 84 | 85 | 86 | 87 | 88 | 89 | 8A | 8B | 8C | 8D | 8E | 8F |
|---|---|---|---|---|---|---|---|---|---|---|---|---|---|---|---|---|
| Win-1252 Char. ($C_{32}$, $C_{33}$ or $C_{22}$) | € | NA | ' | ƒ | " | … | † | ‡ | ˆ | ‰ | Š | ‹ | Œ | NA | Ž | NA |
| UTF-8 encoding | E2 82 AC | NA | E2 80 9A | C6 92 | E2 80 9E | E2 80 26 | E2 80 20 | E2 80 21 | CB 86 | E2 80 B0 | C5 A0 | E2 80 B9 | C5 92 | NA | C5 BD | NA |
| UTF-16 encoding | 20 AC | NA | 20 1A | 01 92 | 20 1E | 20 26 | 20 20 | 20 21 | 02 C6 | 20 30 | 01 60 | 20 39 | 01 52 | NA | 01 7D | NA |

For second byte $C_{32}$ or third byte $C_{33}$ having a hex code value in the range of [90]-[9F], Table 6 below presents the corresponding character from the Win-1252 character set, the UTF-8 hexadecimal encoding of the corresponding character from the Win-1252 character set, and UTF-16 hexadecimal encoding of the corresponding character. As can be seen from Table 6, and similarly to Table 5, the encodings in the UTF-8 and UTF-16 character sets are not consecutive. Two of the Win-1252 characters do not map to an assigned character in the UTF-8 or UTF-16 character sets (indicated as "NA" in Table 6), so if a double conversion takes place, these characters will be mapped to the Unicode replacement character.

TABLE 6

| Win-1252 code/ 2nd or 3rd UTF-8 byte | 90 | 91 | 92 | 93 | 94 | 95 | 96 | 97 | 98 | 99 | 9A | 9B | 9C | 9D | 9E | 9F |
|---|---|---|---|---|---|---|---|---|---|---|---|---|---|---|---|---|
| Win-1252 Char. ($C_{32}$, $C_{33}$ or $C_{22}$) | NA | ' | ' | " | " | • | – | — | ~ | ™ | š | › | œ | NA | ž | Ÿ |
| UTF-8 encoding | NA | E2 80 98 | E2 80 99 | E2 80 9C | E2 80 9D | E2 80 22 | E2 80 93 | E2 80 94 | CB 9C | E2 84 A2 | C5 A1 | E2 80 BA | C5 93 | NA | C5 BE | C5 B8 |
| UTF-16 encoding | NA | 20 18 | 20 19 | 20 1C | 20 1D | 20 22 | 20 13 | 20 14 | 02 DC | 21 22 | 01 61 | 20 3A | 01 53 | NA | 01 7E | 01 78 |

Referring again to Table 1, the two bytes of a two-byte UTF-8 character have the structure 110x xxxx 10xx xxxx. These two bytes will be referred herein as $C_{21}$ and $C_{22}$. As can be seen from Table 1, the second byte $C_{22}$ of a two-byte UTF-8 character has the same range of allowable hex code values as the second byte $C_{32}$ and third byte $C_{33}$ of a three byte UTF-8 character. Therefore, the character mappings into the UTF-8 and UTF-16 character sets for a misinterpreted $C_{22}$ byte are the same as the character sets for a misinterpreted $C_{32}$ byte or $C_{33}$ byte.

For two-byte UTF-8 characters, because the first byte $C_{21}$ is of the form 110x xxxx, byte $C_{21}$ can take on a hex code value within the hexadecimal range of [C0] to [DF], inclusive. For a subset of this range of $C_{21}$, from [C0] to [CF], Table 7 below presents the corresponding character from the Win-1252 character set, the UTF-8 hexadecimal encoding of the corresponding character from the Win-1252 character set, and UTF-16 hexadecimal encoding of the corresponding character.

TABLE 7

| Win-1252 code/ 1st UTF-8 byte | C0 | C1 | C2 | C3 | C4 | C5 | C6 | C7 | C8 | C9 | CA | CB | CC | CD | CE | CF |
|---|---|---|---|---|---|---|---|---|---|---|---|---|---|---|---|---|
| Win-1252 Char. ($C_{21}$) | À | Á | Â | Ã | Ä | Å | Æ | Ç | È | É | Ê | Ë | Ì | Í | Î | Ï |
| UTF-8 encoding of $C_{21}$ | C3 80 | C3 81 | C3 82 | C3 83 | C3 84 | C3 85 | C3 86 | C3 87 | C3 88 | C3 89 | C3 8A | C3 8B | C3 8C | C3 8D | C3 8E | C3 8F |
| UTF-16 encoding of $C_{21}$ | 00 C0 | 00 C1 | 00 C2 | 00 C3 | 00 C4 | 00 C5 | 00 C6 | 00 C7 | 00 C8 | 00 C9 | 00 CA | 00 CB | 00 CC | 00 CD | 00 CE | 00 CF |

For hex code values of $C_{21}$ within the range [D0]-[DF], Table 8 below presents the corresponding character from the Win-1252 character set, the UTF-8 hexadecimal encoding of the corresponding character from the Win-1252 character set, and UTF-16 hexadecimal encoding of the corresponding character.

TABLE 8

| Win-1252 code/ 1st UTF-8 byte | D0 | D1 | D2 | D3 | D4 | D5 | D6 | D7 | D8 | D9 | DA | DB | DC | DD | DE | DF |
|---|---|---|---|---|---|---|---|---|---|---|---|---|---|---|---|---|
| Win-1252 Char. ($C_{21}$) | Ð | Ñ | Ò | Ó | Ô | Õ | Ö | × | Ø | Ù | Ú | Û | Ü | Ý | Þ | β |
| UTF-8 encoding of $C_{21}$ | C3 | C3 | C3 | C3 | C3 | C3 | C3 | C3 | C3 | C3 | C3 | C3 | C3 | C3 | C3 | C3 |
|  | 90 | 91 | 92 | 93 | 94 | 95 | 96 | 97 | 98 | 99 | 9A | 9B | 9C | 9D | 9E | 9F |
| UTF-16 encoding of $C_{21}$ | 00 | 00 | 00 | 00 | 00 | 00 | 00 | 00 | 00 | 00 | 00 | 00 | 00 | 00 | 00 | 00 |
|  | D0 | D1 | D2 | D3 | D4 | D5 | D6 | D7 | D8 | D9 | DA | DB | DC | DD | DE | DF |

For two-byte UTF-8 characters, the second byte $C_{22}$ is of the form 10xx xxxx, which is the same form as the second and third bytes $C_{32}$ and $C_{33}$ of three-bytes UTF-8 characters. Therefore, an enumeration of possible hex code values for $C_{22}$ is the same as the second and third bytes $C_{32}$ and $C_{33}$ of three-bytes UTF-8 characters.

As discussed above, if a three-byte UTF-8 character has suffered an incorrect intermediate encoding conversion to and from the Win-1252 character set, Table 2 presents 16 outcomes for mis-encoding the first byte, and Tables 3-6 present 64 outcomes for mis-encoding each of the second and third bytes. Therefore, a total of 65,536 outcomes are possible for a three-byte mis-encoding to and from the Win-1252 character set.

Similarly, for a two-byte mis-encoding to and from the Win-1252 character set, the first byte can take on one of 32 hex code values and the second byte can take on one of 64 hex code values. Therefore, a total of 2,048 outcomes are possible for a two-byte mis-encoding to and from the Win-1252 character set.

The incorrect intermediate character encoding is not limited to Win-1252, and can be any other character set known in the art. Therefore, additional outcomes are possible if the incorrect intermediate character encoding is not Win-1252, and can be analyzed using the table-based method presented above, using additional tables (not shown).

The search for a large but finite number of possible outcomes, such as the outcomes presented in Tables 2-8, can be accommodated by a lookup table or an algorithmic search approach. In an algorithmic approach, characters in the document under test are parsed, such as on a character-by-character basis, in order to search for a pattern of characters that indicates a possible double conversion of a character. An algorithmic approach may be preferable as the number of possible outcomes increases. In other words, when searching for a double conversion, the search is for a pattern of bytes in a displayed character set that could correspond to a single character from a source character set, if the character from the source character set had undergone one or more conversions to an unintended character set prior to the pattern of bytes being displayed.

FIG. 3 illustrates at a high level of abstraction detection processes 300 in accord with an embodiment of the invention. Detection processes 300 may be useful for implementing stage 204 and/or stage 205 of FIG. 2. At stage 301, the document is searched for the occurrence of a defect signature. The defect signature can be a sequence of characters that may indicate a double-conversion of a two-byte UTF-8 character, a double-conversion of a three-byte UTF-8 character, and/or one or more of the other error signatures described earlier. If the document is streamed, then a byte-by-byte comparison, or on slightly higher level of abstraction a character-by-character comparison, can be used for search stage 301. Alternatively, if the entire document is available for searching, such as a downloaded web page, then search stage 301 may also be performed by string search processes or string matching processes, such as hashing, an Aho-Corasick string matching process, a Commentz-Walter process, or a Rabin-Karp string search process. The choice of string searching or string matching process is not limited in this regard and may include other processes known in the art. Some processes may be more suitable for searching for a finite set of patterns. However, even for a downloaded web page, a byte-by-byte comparison can be used for search stage 301.

Returning again to FIG. 3, at one or more times during search 301 of the document, a stage 302 is entered during which a decision is made whether an error signature is found in the document. The error signature is based upon the character mappings presented in Tables 2-8. If search 301 uses a simple byte-by-byte process, then stage 302 may be entered for substantially each byte of the document. If search 301 uses a different string matching process, then stage 302 may be entered a fewer number of times during search 301 of the document. If an error signature is not found during stage 302, then control passes to stage 304.

If an error signature is found during stage 302, then control passes to stage 303 during which an indicator is activated to indicate that the document contains an error signature. The indicator may be, for instance, a Boolean bit or flag. Upon completion of stage 303, then control passes to stage 304.

During stage 304, a decision is made whether to continue searching. The search may stop if, for instance, the end of the document has been reached or if the object of process 300 is only to determine whether the document contains a defect, but not the number of defects. If the decision is to continue searching, then the process returns to search stage 301. It should be understood implicitly that search stage 301 will terminate at the end of the document, and that at the end of the document, decision stage 302 may be entered one last time.

Figure 4:
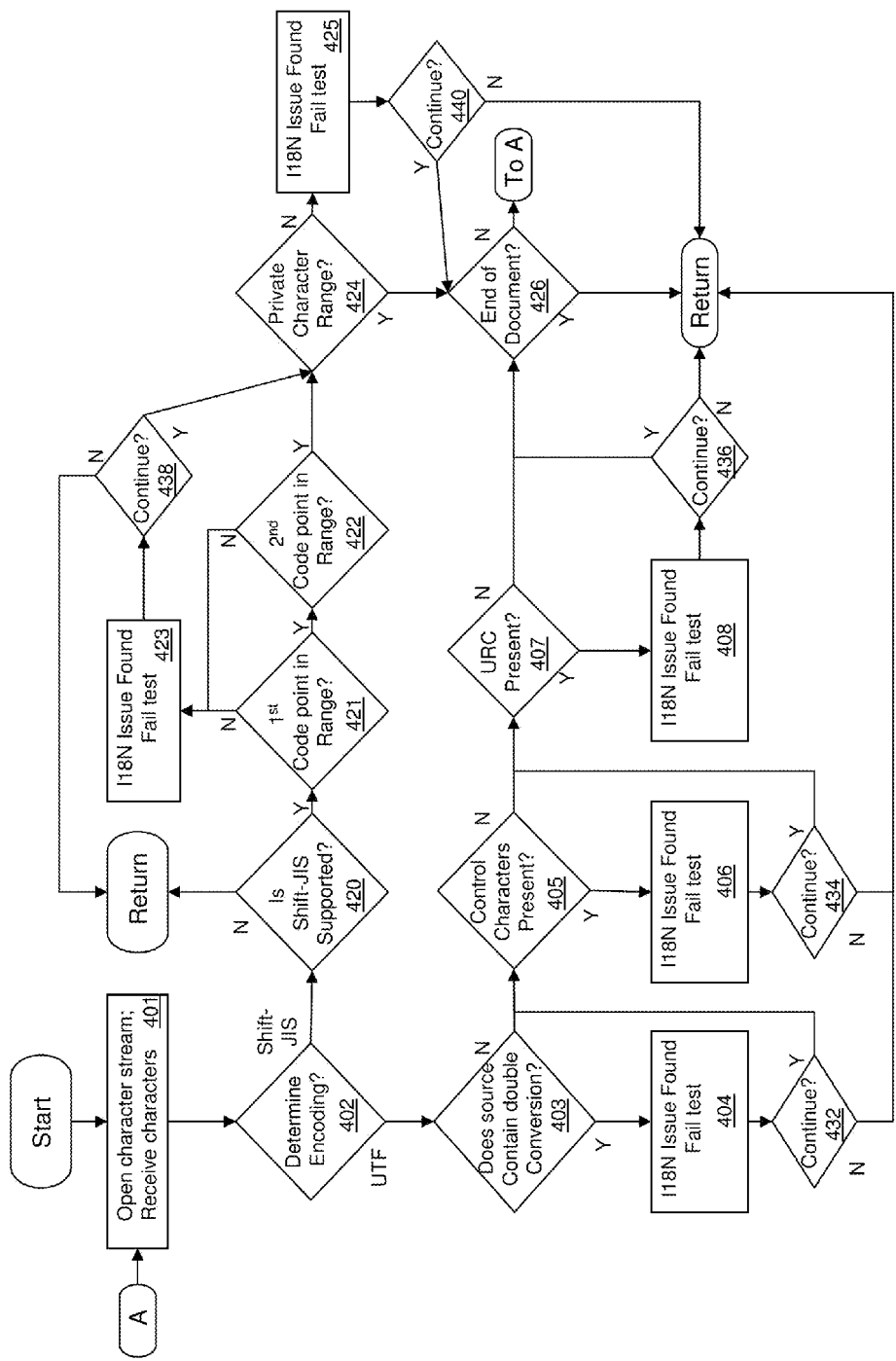
FIG. 4 shows a second flow chart of a process to detect I18N errors, in accordance with one embodiment of the invention.

FIG. 4 illustrates at a lower level of abstraction a detection process 400, which is one embodiment of a detection process 300. Detection process 400 uses a byte-by-byte process to detect one or more suspected I18N errors. Certain steps or tests may be performed in a different sequence than that shown in the embodiment of FIG. 4. At any point within detection process 400, if a suspected I18N error is detected, the process may optionally return or exit at that point if the inquiry is only whether the document contains errors at all, and not to determine a complete analysis of all suspected I18N error in the document.

At stage 401 of the detection process 400, the process is conditioned or enabled to receive or begin processing a character stream representing the document to test, and characters are received. In stage 402, the character stream is tested to determine whether it corresponds to a UTF encoding or a Shift-JIS encoding. Encodings in addition to Shift-JIS (not shown in FIG. 4) may be tested in stage 402, with corresponding interfaces to additional stages (not shown in FIG. 4) of detection process 400 if encodings other than UTF or Shift-JIS are detected. However, testing only for the UTF and Shift-JIS encodings is ordinarily adequate because of their predominate usage.

If the result of stage 402 is that the document corresponds to UTF encoding, then stage 403 is entered to test whether the source character stream contains a double conversion error. If such an error is found, an indicator (e.g., a flag) is activated within stage 404 to indicate that an I18N issue was found and that the test has failed. Control then passes from stage 404 to stage 432 where, optionally, the test can end here by returning to the calling routine, or can continue to look for additional errors by passing to stage 405. Control also passes to stage 405 if no double conversion error was found during stage 403.

During stage 405, the source character stream is tested for the presence of a control character. If such an error is found, an indicator is activated within stage 406 to indicate that an I18N issue was found and that the test has failed. Control then passes from stage 406 to stage 434 where, optionally, the test can end here by returning to the calling routine, or continue to look for additional errors by passing to stage 407. Control also passes to stage 407 if no control character was found during stage 405.

During stage 407, the source character stream is tested for the presence of a URC character. If such an error is found, an indicator is activated within stage 408 to indicate that an I18N issue was found and that the test has failed. Control then passes from stage 408 to stage 436 where, optionally, the test can end here by returning to the calling routine, or can continue to look for additional errors by passing to stage 426. Control also passes to stage 426 if no URC character was found within stage 407.

If the result of stage 402 is that the document corresponds to Shift-JIS encoding, then stage 420 is entered to test whether Shift-JIS encoding is supported. Support can usually be determined by reading or querying a language parameter of the system. If Shift-JIS is not supported, then the detection process 400 exits and returns. If Shift-JIS is supported, then the detection process 400 transitions to stage 421 to determine whether the first byte of the code point is within a range of valid values for Shift-JIS characters. If the first byte is within the valid range of values, then control passes to stage 422 to determine whether the second byte of the code point is within a range of valid values for Shift-JIS characters. If at stage 421 or stage 422 it is determined that at least one of the byte values of the code point is not within the valid range, an indicator is activated within stage 423 to indicate that an I18N issue was found and that the test has failed. Control then passes from stage 423 to stage 438 where, optionally, the test can end here by returning to the calling routine, or can continue to look for additional errors by passing to stage 424. Control also passes to stage 424 if both the first and second bytes of the code point are within a respective range of valid values for Shift-JIS characters, as determined during stages 421 and 422.

During stage 424, the character read from the source character stream is tested to determine whether it is within the range of private characters. If not within the range of private characters, an indicator is activated within stage 425 to indicate that an I18N issue was found and that the test has failed. Control then passes from stage 425 to stage 440 where, optionally, the test can end here by returning to the calling routine, or can continue to look for additional errors by passing to stage 426. Control also passes to stage 426 if the code point is within a range of private characters.

During stage 426, the end-of-document is tested. If the end of the document has been reached, the detection process 400 exits and returns. If the end of the document has not been reached, then the detection process 400 loops back to step 401 in order to receive and begin processing more characters of the document.

Figure 5:
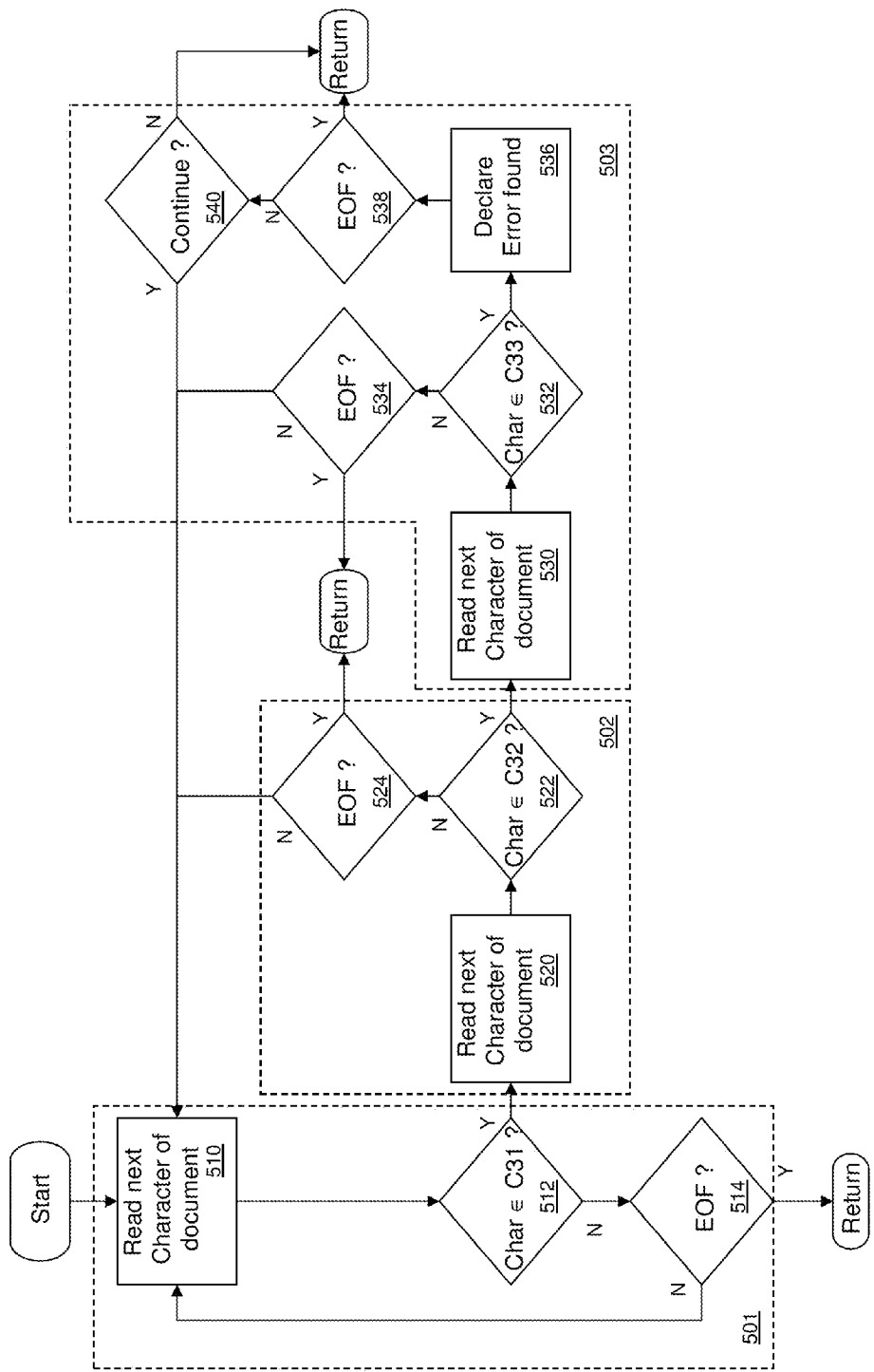
FIG. 5 shows a third flow chart of a process to detect I18N errors, in accordance with one embodiment of the invention.

FIG. 5 illustrates at a lower level of abstraction a detection process 500, which is one embodiment of a process to detect whether the source contains suspected double-conversion of a three-byte UTF-8 character. It should be understood that the bytes and/or characters of the document may be tested for other types of I18N errors (not shown in FIG. 5) as detection process 500 is being performed. Detection process 500 is adaptable to be used within stage 403 of detection process 400. Detection process 500 uses a relatively simple character-by-character process to detect suspected double-conversion of a three-byte UTF-8 character. Referring to the character mappings presented in Tables 2-6, it should be recognized that if an application or network service under test has a double-converted three byte UTF-8 character, then the corrupted text will include a three-character sequence of the form: $C_{31}C_{32}C_{33}$, in which $C_{31}$ is one of the listed characters shown in Table 2, and $C_{32}$ and $C_{33}$ are one of the listed characters shown in Tables 3-6.

At a first stage 501 of the detection process 500, the document to be tested will be searched for an occurrence of one of the listed characters of $C_{31}$. The search ordinarily will be performed on a character-by-character basis from the start of the document. Stage 501 includes sub-stage 510 in which a character of the document is read. Control passes from sub-stage 510 to sub-stage 512 (within stage 501), during which the character that was read is tested whether it is one of the listed characters of $C_{31}$. If the character that was read is not among the listed characters, then control passes to sub-stage 514 (within stage 501) to test whether the end of the document has been reached. If the end of the document (i.e., end of file "EOF") is indicated by sub-stage 514, then detection process 500 returns to the calling routine.

If one of the listed characters of $C_{31}$ is found, then that character is designated as a first candidate character, and control of the detection process 500 transitions to a second stage 502. In second stage 502, the next character to be examined (the character immediately following the first candidate character), is examined to determine if is one of the listed characters for $C_{32}$. Stage 502 includes sub-stage 520 in which a character of the document is read. Control passes from sub-stage 520 to sub-stage 522 (within stage 502), during which the character that was read is tested whether it is one of the listed characters of $C_{32}$. If the character that was read is not among the listed characters, then control passes to sub-stage 524 (within stage 502) to test whether the end of the document has been reached. If the end of the document is indicated by sub-stage 524, then detection process 500 returns to the calling routine. If the character to be examined is not among the listed characters for $C_{32}$, then control of detection process 500 returns to first stage 501. If the character to be examined is among the listed characters for $C_{32}$, then that character is designated as a second candidate character, and control of detection process 500 transitions to third stage 503.

In third stage 503, the next character to be examined (the character immediately following the second candidate character), is examined to determine if is one of the listed characters for $C_{33}$. Stage 503 includes sub-stage 530 in which a character of the document is read. Control passes from sub-stage 530 to sub-stage 532 (within stage 503), during which the character that was read is tested whether it is one of the listed characters of $C_{33}$. If the character that was read is not among the listed characters, then control passes to sub-stage 534 (within stage 503) to test whether the end of the document has been reached. If the end of the document is indicated by sub-stage 534, then detection process 500 returns to the calling routine. If the end of the document has not been reached, and if it is desired to examine the remainder of the document under test for additional instances of a suspected double-conversion of a three-byte UTF-8 character, then control of detection process 500 returns to first stage 501.

If the character to be examined is among the listed characters for $C_{33}$, then control passes from sub-stage 532 to sub-stage 536 (within stage 503), during which the document under test is identified as containing a suspected double-conversion of a three-byte UTF-8 character. Here, the system declares an error has been found. Control then passes from sub-stage 536 to sub-stage 538 (within stage 503) to test whether the end of the document or file ("EOF") has been reached. If the end of the document is indicated by sub-stage 538, then detection process 500 returns to the calling routine. If the end of the document has not been reached, control passes from sub-stage 538 to sub-stage 540 (within stage 503) to determine whether it is desired to examine the remainder of the document under test for additional instances of a suspected double-conversion of a three-byte UTF-8 character. If the result of sub-stage 540 is negative, then detection process 500 returns to the calling routine. If the result of sub-stage 540 is positive, then control passes from sub-stage 540 to first stage 501.

Alternatively, within third stage 503, a decision in sub-stage 540 whether to examine the remainder of the document under test may be made before a decision in sub-stage 538 checking whether the end of the file has been reached. If the inquiry is whether any suspected double-conversion errors are present but not a count of the number of such suspected double-conversion errors, then it is not necessary to examine the remainder of the document under test, and detection process 500 can return to the calling routine.

Figure 6:
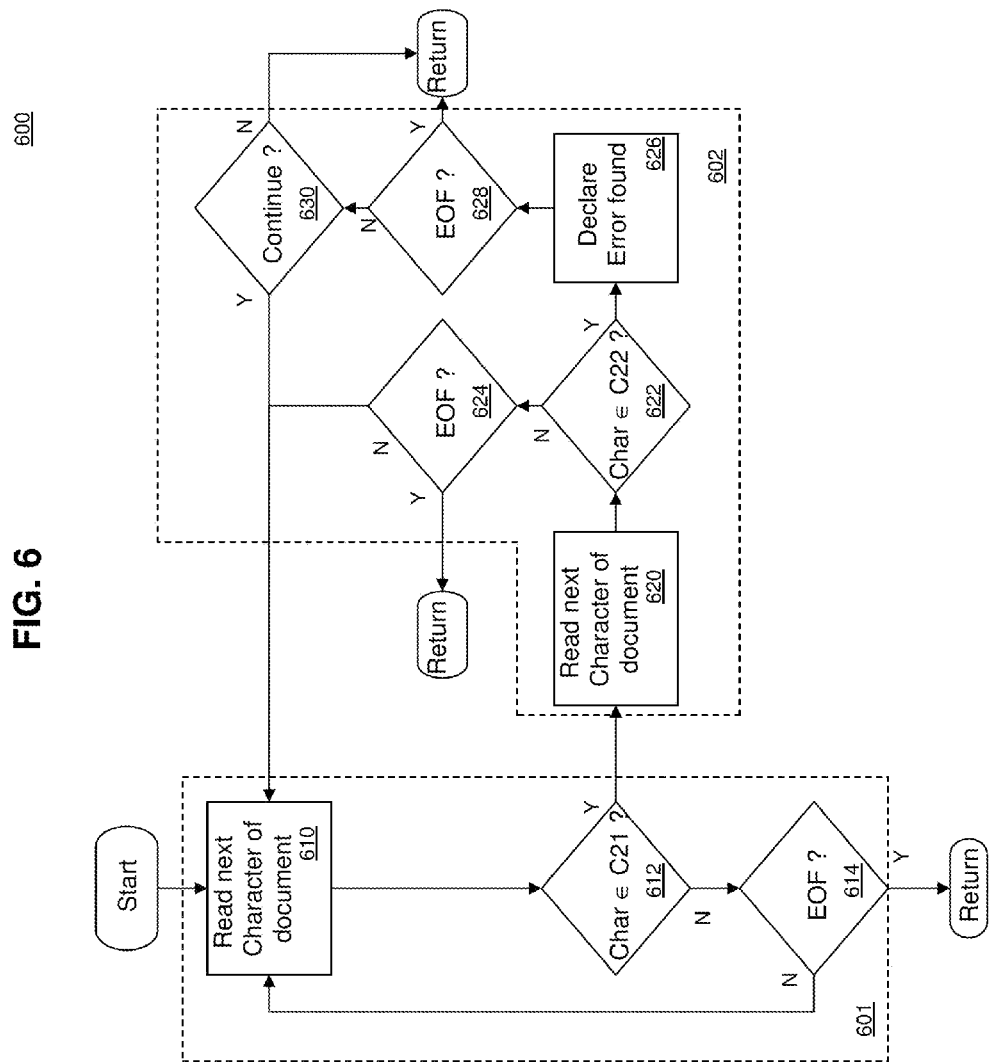
FIG. 6 shows a fourth flow chart of a process to detect I18N errors, in accordance with one embodiment of the invention.

Similarly, FIG. 6 illustrates at a lower level of abstraction a detection process 600, which is one embodiment of a process to detect whether the source contains a suspected double-conversion of a two-byte UTF-8 character. It should be understood that the characters and/or bytes of the document may be tested for other types of I18N errors (not shown in FIG. 6) as detection process 600 is being performed. Detection process 600 is adaptable to be used within stage 403 of detection process 400. Referring to the character mappings presented in Tables 3-8, it should be recognized that if an application or network service under test has a double-converted two-byte UTF-8 character, then the corrupted text will include a two-character sequence of the form: $C_{21}C_{22}$, in which $C_{21}$ is one of the listed characters shown in Tables 7-8, and $C_{22}$ is one of the listed characters shown in Tables 3-6.

At a first stage 601 of the detection process 600, the document to be tested will be searched for an occurrence of one of the listed characters of $C_{21}$. The search ordinarily will be performed on a character-by-character basis from the start of the document. Stage 601 includes sub-stage 610 in which a character of the document is read. Control passes from sub-stage 610 to sub-stage 612 (within stage 601), during which the character that was read is tested whether it is one of the listed characters of $C_{21}$. If the character that was read is not among the listed characters, then control passes to sub-stage 614 (within stage 601) to test whether the end of the document has been reached. If the end of the document is indicated by sub-stage 614, then detection process 600 returns to the calling routine.

If one of the listed characters of $C_{21}$ is found, then that character is designated as a first candidate character, and control of the detection process 600 transitions to a second stage 602. In second stage 602, the next character to be examined (the character immediately following the first candidate character), is examined to determine if is one of the listed characters for $C_{22}$. Stage 602 includes sub-stage 620 in which a character of the document is read. Control passes from sub-stage 620 to sub-stage 622 (within stage 602), during which the character that was read is tested whether it is one of the listed characters of $C_{22}$. If the character that was read is not among the listed characters, then control passes to sub-stage 624 (within stage 602) to test whether the end of the document has been reached. If the end of the document is indicated by sub-stage 624, then detection process 600 returns to the calling routine; otherwise control of process 600 returns to first stage 601.

If the character to be examined is among the listed characters for $C_{22}$, then the document under test is identified as containing a suspected double-conversion of a two-byte UTF-8 character. If the character to be examined is the last character of the document, then process 600 returns to the calling routine. If the character to be examined is not the last character of the document, and if it is desired to examine the remainder of the document under test for additional instances of a suspected double-conversion of a two-byte UTF-8 character, then control of process 600 returns to first stage 601. It is not necessary to examine the remainder of the document under test if, for instance, the inquiry was whether any such suspected double-conversion errors were present but not a count of the number of such suspected double-conversion errors, in which case process 600 can returns to the calling routine upon the first detection of a suspected double-conversion of a two-byte UTF-8 character.

Detection processes 500 and 600 can be implemented such that they occur either sequentially or concurrently at substantially the same time.

If a document under test suffers from a double conversion of UTF-8 characters, the document will contain a two-character or three-character error signature as described by Tables 2-8. However, the converse may not be true. For instance, the document under test may include a discussion of I18N errors, or the document under test may use Greek symbols in a mathematical formula. In such a case, this may not trigger the double conversion detector. Once case which may trigger double conversion is 'NESTLÉ®', where the 'É' followed by the '®' can trigger double conversion. Also, an error signature may have occurred merely by chance. For instance, in a purely random sequence of bytes, any particular two-byte sequence would be expected to occur once in $256^2$ bytes, i.e., once every 65,636 bytes. Any particular three-byte sequence would be expected to occur once every $256^3$ bytes (16,777,216 bytes) in a purely random sequence of bytes.

However, textual documents are not purely random sequences of bytes, and the actual probabilities of the two-character and three-character signatures occurring without a double conversion of UTF-8 characters is determined at least in part by the probability of occurrence of the characters $C_{21}$, $C_{22}$, $C_{31}$, $C_{22}$ and $C_{33}$ in the document under test. Referring to Tables 2-8, since at least in the English language the characters $C_{21}$, $C_{22}$, $C_{31}$, $C_{22}$ and $C_{33}$ are relatively uncommon, the probability of any one of the two-byte and three-byte error signatures occurring without a double conversion of UTF-8 characters is much lower than once every 65,636 bytes or 16,777,216 bytes. Therefore, a probability of occurrence of the characters $C_{21}$ and $C_{22}$, or $C_{31}$, $C_{32}$ and $C_{33}$, either individually or in combination, can be used to refine the inference whether a double conversion of UTF-8 characters has occurred. The probability can be based on, for instance, a priori knowledge of the source document (e.g., an English-language document), its content (e.g., a mathematical treatise) and/or based on adaptively tracking characters that are encountered in the document under test.

If the characters $C_{21}$ and $C_{22}$, or $C_{31}$, $C_{22}$ and $C_{33}$ map to a single character in a source character set under a hypothesis of a double conversion, the inference of whether the error signature occurred as a result of a double conversion of characters, rather than by chance, can be further refined by examining the probability of the character in the source document. A chance occurrence of the error signature may be indicated if the error signature maps to a low-probability character in the source document.

Once a suspected double conversion of UTF-8 characters is discovered, the original source document (e.g., the original web) should be checked to confirm whether an actual double conversion of UTF-8 characters exists.

Embodiments of the invention described herein allow for relatively easy fine-tuning and extension, by nature of the systematic, character set-based approach presented herein. For example, to prevent false positives, the error signatures can be modified by including or taking out individual characters, as it was done above with the inclusion of the Unicode replacement character ("URC") in the character sets for $C_{22}$, $C_{32}$ and $C_{33}$.

Detection process 300 may be implemented by one or more processors, as shown in FIG. 1B, that are programmed with software stored in a storage medium, the software being configured to perform the detection process 300.

Upon completion of detection process 300, further error baseline analysis can take place, for instance by stages 205-207 of the process of FIG. 2.

Figure 7:
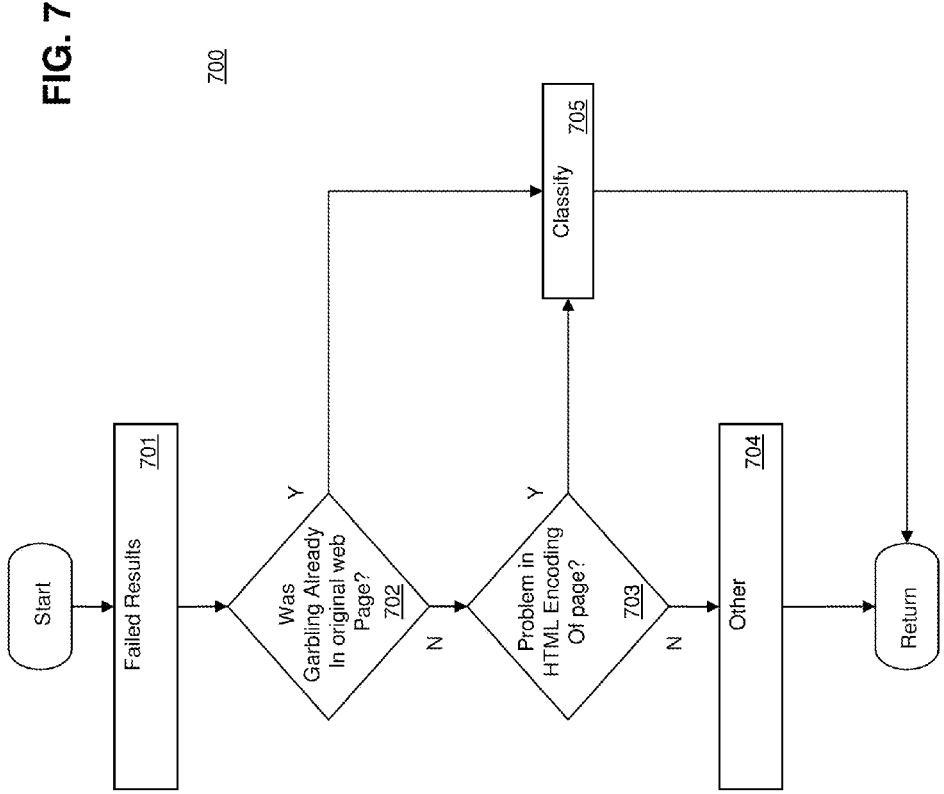
FIG. 7 shows a flow chart of a process to classify a detected failure, in accordance with one embodiment of the invention.

FIG. 7 illustrates at a lower level of abstraction a process 700 to classify a detected failure, which is one embodiment of a process referred to in stage 205 of process 200. Process 700 begins at stage 701 upon the occurrence of a suspected I18N error. At stage 702, a determination is made whether the original document or web page already contained the suspected error such as an I18N error; if so, the suspected I18N error is so classified in stage 705. At stage 703, a determination is made whether a problem may lie within the HTML encoding of the original document or web page, for instance if an incorrect character set is specified in the HTML headers. If so, the suspected I18N error is so classified in stage 705. Optionally, additional sources of errors can be categorized in stage 704 and optionally classified in stage 705.

Figure 8:
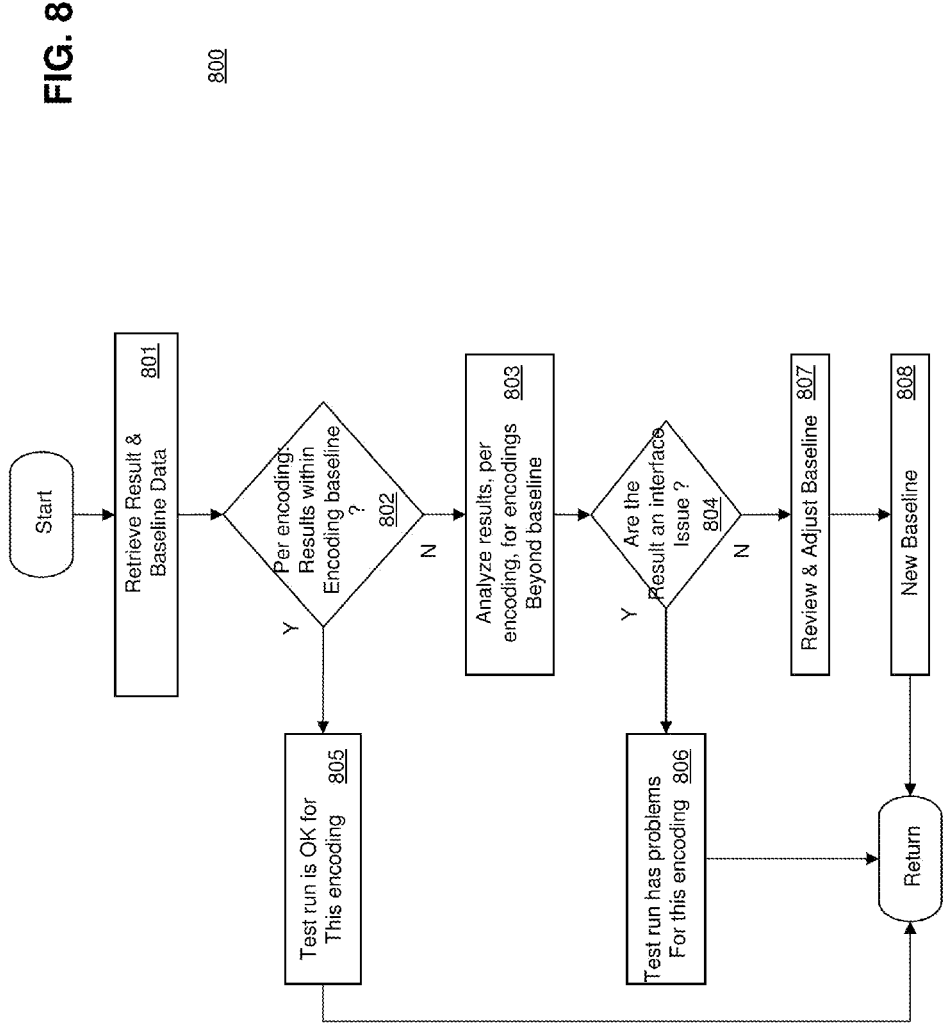
FIG. 8 shows a flow chart of a process to review and baseline the test data, in accordance with one embodiment of the invention.

FIG. 8 illustrates at a lower level of abstraction a process 800 to review and baseline the test data, which is one embodiment of a process referred to in stage 206 and/or stage 207 of process 200. Process 800 begins at stage 801, during which test results are retrieved from storage. Next, at stage 802, the process checks whether within the present locale the test results are within the baseline, for instance if the error rate is below a predetermined threshold or within a predetermined difference from prior results. Locale refers to the locality of where the source page or document is stored. If the test results are within the baseline, then it is identified at stage 805 that the test results are acceptable, and the process 800 exits and returns.

If the test results at stage 802 are not within the baseline, then stage 803 is entered, during which the test results that are outside the encoding baseline are further analyzed.

Next, stage 804 is entered, during which it is analyzed whether the suspected I18N error is an artifact of the interface between the system 100 for testing and the application or network service 103 under test. For instance, a character may not be garbled in the application or network service 103 under test, but the interface may have corrupted the character stream while indexing, parsing or displaying the source. Stage 804 also analyzes whether the suspected I18N error is a problem related to processing and rendering the I18N content of the document or web page under test. Assuming the suspected I18N error is not an artifact of system 100 or the interface to the application or network service 103 under test, then stage 807 is entered during which the baseline is reviewed and adjusted, and stage 808 is entered during which a new baseline is calculated.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of analyzing errors in an electronic document comprising a plurality of character strings, the method comprising:
   determining whether a one of the plurality of the character strings is encoded in one of a first encoding or a second encoding, the second encoding being different than the first encoding;
   if the character string is encoded in the first encoding, testing whether a value of a characteristic of the character string is within a first preset range for the characteristic; and
   if the character string is encoded in the second encoding, testing whether the character string contains an I18N error.

2. The method claim 1, wherein the first preset range comprises values of the characteristic for shift-JIS code points.

3. The method claim 1, wherein the first preset range comprises one or more private character values.

4. The method claim 1, further comprising, if the character string is encoded in the second encoding, testing whether the character string comprises at least one character within a second preset range of characters.

5. The method claim 4, wherein the second preset range of characters includes one or more of control characters and a URC character.

6. The method claim 1, wherein testing whether the character string contains the I18N error further comprises:
   converting the character string to a sequence of bytes with a third encoding, the third encoding being different from the first and second encodings;
   converting the sequence of bytes to a converted character string of a fourth encoding, the converted character string including a plurality of characters; and
   confirming that the I18N error is present based on a sequence of two or three characters of the plurality of characters in the converted character string depending on positions of the two or three characters, all of the two or three characters being members of a predefined character set.

7. The method claim 1, further comprising:
   receiving the electronic document from a service under test;
   categorizing a test result into a category of error, to produce a category count; and
   storing the category count and a status of the service under test.

8. The method claim 7, further comprising:
   initiating a test of the service under test if the status of the service under test changes.

9. The method claim 7, further comprising:
   computing a first statistic from the category count over a first period of time;

computing a second statistic from the category count over a second period of time, the second period of time shorter than the first period of time; and initiating a test of the service under test if the second statistic exceeds the first statistic by more than a configurable amount.

10. A system to detect character set translation errors in an electronic document, comprising:
- a test scheduler configured to generate a stimulus to begin a test;
- a test request generator, configured to generate a sample document in response to the stimulus from the test scheduler;
- an output interface to provide the sample document to a system under test;
- an input interface to receive a test electronic document from the system under test, the test electronic document being derived from the provided sample document;
- an error determination unit configured to find one or more suspected errors in the test electronic document;
- a result classifier operably coupled to a data store and configured to classify one or more suspected errors to a category of error; and
- a baseline analyzer coupled to the result classifier in order to provide performance metrics to a user.

11. The system of claim 10, wherein the test scheduler is configured to schedule a plurality of tests.

12. The system of claim 10, wherein the test scheduler is configured to schedule tests chronologically or at predetermined intervals from a previous test.

13. The system of claim 10, wherein the test scheduler is configured to schedule tests upon an occurrence of a predetermined triggering event.

14. The system of claim 10, wherein the test scheduler is configured to schedule tests on demand in response to a request from a user.

15. The system of claim 10, wherein the one or more suspected errors are indicated by predetermined character strings in the electronic document under test.

16. The system of claim 10, wherein the result classifier comprises an interface to receive one or more indications of test conditions.

17. The system of claim 10, wherein the baseline analyzer is configured to analyze data from a plurality of tests.

18. The system of claim 10, wherein the error determination unit comprises decision rules, at least one decision rule being based upon character probabilities in the test electronic document.

* * * * *